(No Model.)

R. H. STEWART.
MILK SKIMMER.

No. 333,484. Patented Dec. 29, 1885.

WITNESSES:
A. E. Eader
John E. Morris.

INVENTOR:
Robt. H. Stewart
By Chas B. Mann
Attorney.

UNITED STATES PATENT OFFICE.

ROBERT HOYT STEWART, OF BALTIMORE, MARYLAND, ASSIGNOR TO JOHN R. LARUS, OF SAME PLACE.

MILK-SKIMMER.

SPECIFICATION forming part of Letters Patent No. 333,484, dated December 29, 1885.

Application filed May 28, 1884. Serial No. 133,005. (No model.)

*To all whom it may concern:*

Be it known that I, ROBERT H. STEWART, a citizen of the United States, residing at Baltimore, in the State of Maryland, have invented certain new and useful Improvements in Milk-Skimmers, of which the following is a specification.

My invention relates to an improved milk-skimmer, whereby all the cream on the surface of milk may be lifted therefrom bodily.

The construction of the improved skimmer, whereby the desired result is accomplished, will be described in connection with the accompanying drawings, which illustrate what is deemed the best means of carrying the invention into effect.

Figure 1:
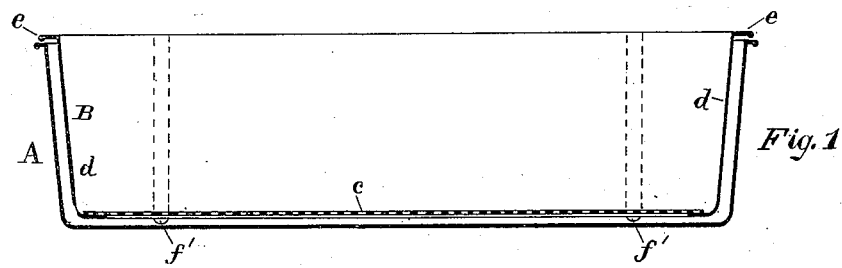
Figure 2:
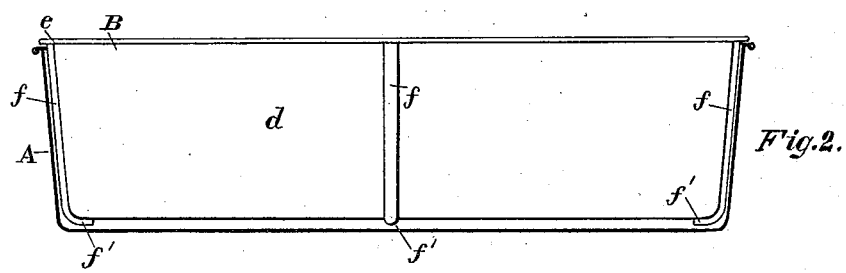
Figure 3:
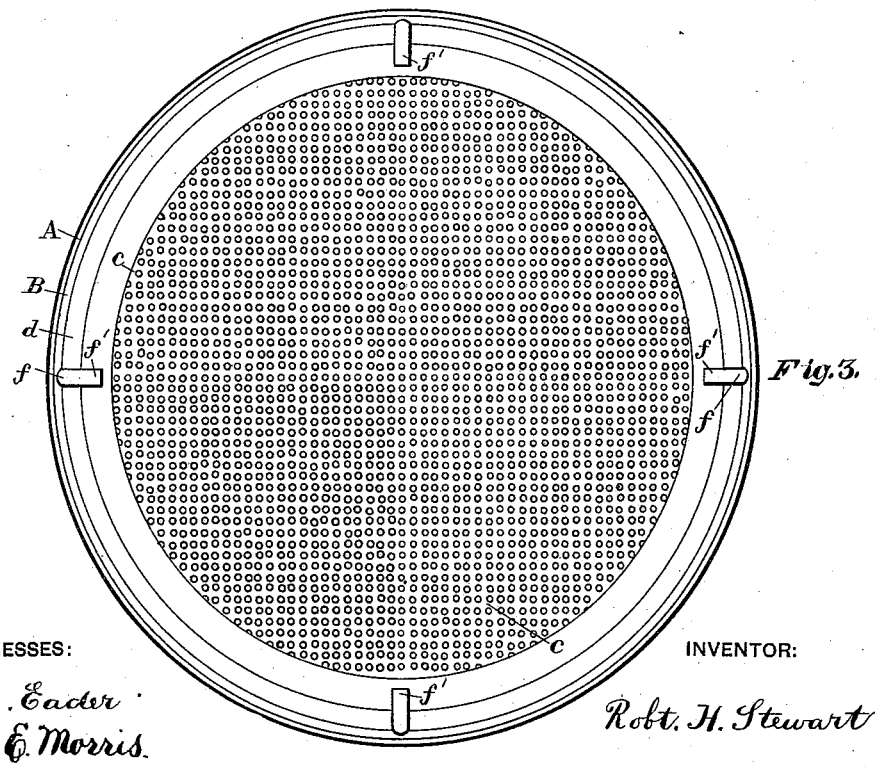

In the accompanying drawings, Figure 1 is a diametrical section of the skimmer and milk-pan, taken on a line extending horizontally across Fig. 3. Fig. 2 is a side view of the skimmer and a diametrical section of the milk-pan, on the same plane as that of Fig. 1. Fig. 3 is a bottom view of the skimmer.

The letter A designates an ordinary milk-pan. The skimmer B is a pan having a finely-perforated bottom, $c$. The fine perforations extend over the entire surface of the bottom, and are of sufficient size to readily pass milk, but not sufficient to pass cream. I have found that perforations of about eighteen standard wire-gage are a suitable size, though a little larger or a little smaller will answer. The wall $d$ of the skimmer-pan, to which the perforated bottom is attached, should be deep enough to suit the milk-pan with which it is intended to be used. A flange, $e$, may rest on the top edge of the milk-pan, and thereby support it; or its feet $f'$, hereinafter described, may set directly on the bottom of the milk-pan and support it. In this case the flange $e$ will not rest on the top edge, but will project above the same. In either case it will be seen, by reference to Figs. 1 and 2, that while the perforated bottom of the skimmer is near the bottom of the milk-pan its surface is not and cannot be in contact with the milk-pan. This is important, for the reason that the skimmer occupies the milk-pan while the cream is rising, and as the perforated bottom is submerged thus near the milk-pan bottom none of the cream in rising to the surface has to rise through the perforations, and while accomplishing this desideratum the perforated bottom is itself protected from wear or damage by avoiding contact; and, also, anything in the milk which may have settled to the bottom of the milk-pan will not be disturbed when the skimmer is lifted to remove the cream. As the skimmer sets within the milk-pan, it is important to prevent its wall $d$ from coming in contact with or setting too close to the wall of the milk-pan, for the reason that if this occurred the milk would rise up between the two walls by the operation of capillary attraction and overflow. Guards $f$ are therefore attached to the exterior of the wall of the skimmer-pan. These guards are four in number, and comprise a projecting vertical rib, the four having positions equidistant around the wall. The projecting rib-guards may be formed by any suitable means, and have any shape which will serve the purpose. In the present case they are shown as consisting of pieces of half-round wire soldered to the wall. The lower end of each projecting guard turns under the skimmer-bottom a short distance, thereby forming the feet $f'$, which support the skimmer, as already described. These guards allow the skimmer to be of size nearly equal to the milk-pan without liability of the skimmer coming in contact with the wall of the said pan.

In operation the skimmer is set within the milk-pan, which is then filled with milk, and stands the usual time to allow the cream to rise. When the milk is ready to be skimmed, the skimmer is grasped by the flange $e$ and raised slowly, to allow the milk to strain through the finely-perforated bottom $c$. As soon as the latter reaches the cream on the surface, the skimmer is then to be lifted bodily, with the cream in it, from the pan, and at once turned or tilted to deliver the cream into any desired vessel.

The vertical rib-guards $f$ on the skimmer-pan will prevent its wall from coming in contact with the wall of the milk-pan, whatever the height of the latter may be—whether lower or higher—and in this respect the vertical ribs operate differently from the old deice heretofore used as a domestic boiler, wherein an inner vessel with a perforated bottom is kept from contact with the outer vessel by a flange around the rim of the inner vessel. The rim-flange in this case is ineffectual f the wall of the outer vessel should be the lowest.

Having described my invention, I claim and desire to secure by Letters Patent of the United States—

1. A milk-skimmer consisting of a pan having walls $d$, a perforated bottom, $c$, attached to the said walls, and vertical rib-guards $f$, projecting on the exterior of the walls, as set forth.

2. A milk-skimmer consisting of a pan having a wall, $d$, and a perforated bottom, $c$, the exterior of the wall being provided with vertical rib-guards $f$, the lower ends of which turn under the pan-bottom and form feet $f'$, as shown and described.

In testimony whereof I affix my signature in presence of two witnesses.

R. HOYT STEWART.

Witnesses:
R. G. BORDLEY,
J. H. ROSENAN.